Feb. 25, 1964  J. C. CAMM  3,122,080
HIGH SPEED SWITCHING DEVICES
Filed March 1, 1961  2 Sheets-Sheet 1

SOURCE INTENSITY MONITOR

SPECTROGRAPH EXPOSURE MONITOR

JOHN C. CAMM
INVENTOR.

BY Alden D. Redfield
Melvin E. Fredericks
ATTORNEYS

Feb. 25, 1964   J. C. CAMM   3,122,080
HIGH SPEED SWITCHING DEVICES

Filed March 1, 1961   2 Sheets-Sheet 2

JOHN C. CAMM
*INVENTOR.*

BY Alden D. Redfield
Melvin E. Frederick
ATTORNEYS 3,122,080
HIGH SPEED SWITCHING DEVICES
John C. Camm, Manchester, Mass., assignor to Avco Corporation, Cincinnati, Ohio, a corporation of Delaware
Filed Mar. 1, 1961, Ser. No. 92,680
8 Claims. (Cl. 95—55)

The present invention relates to high speed switching devices and in particular to high speed shutters. In connection with studies in high speed shock tube spectroscopy the need has arisen for a high speed shutter for the slit of a spectrograph. In this respect, time-resolved spectrograms of short-duration luminous sources may be obtained with drum camera spectrographs. However, this method has the disadvantage that it requires that a spectrograph be modified drastically to take a drum camera; it neither permits multiple exposures useful in recording low-intensity radiation nor the placing of intensity or wave length calibration spectra adjacent to the spectrum being measured. Electro-optic and magneto-optic shutters may also be used, but they attenuate the radiation and modify the spectral distribution.

The present invention is not subject to any of these disadvantages and when embodied in a shutter comprises a movable slit which is propelled across a stationary spectrograph slit by the thermal expansion of a Joule-heated hairpin-shaped wire.

It is therefore an object of the present invention to provide a high speed switch.

Another object of the present invention is to provide a controllable high speed shutter.

Another object of the present invention is the provision of a high speed shutter that permits multiple exposures and the placing of intensity or wave length calibration spectra adjacent to the spectrum being measured.

Other objects of the invention are as follows:
(a) Provision of a high speed device that may be synchronized.
(b) Provision of a high speed device that has an open position and a closed position.
(c) Provision of a high speed device that can be recycled.
(d) Provision of a nonoptical high speed shutter.
(e) Provision of a high speed shutter wherein exposure time may be controlled.
(f) Provision of a high speed shutter that does not introduce radiation.
(g) Provision of a high speed device that may be actuated with moderate voltages.
(h) Provision of a high speed device that is adaptable, small in size, and that is lightweight.

The novel features that are considered characteristic of this invention are set forth in the appended claims; the invention itself, however, both as to its organization and method of operation, together with additional objects and advantages thereof, will best be understood from the following description of a specific embodiment when read in conjunction with the accompanying drawings, in which:

To facilitate understanding of the present invention it will be described herein as a high speed shutter. It is to be understood, however, that the present invention is not so limited and finds application wherever it is desirable to rapidly move a member from one position to another.

Figure 1:
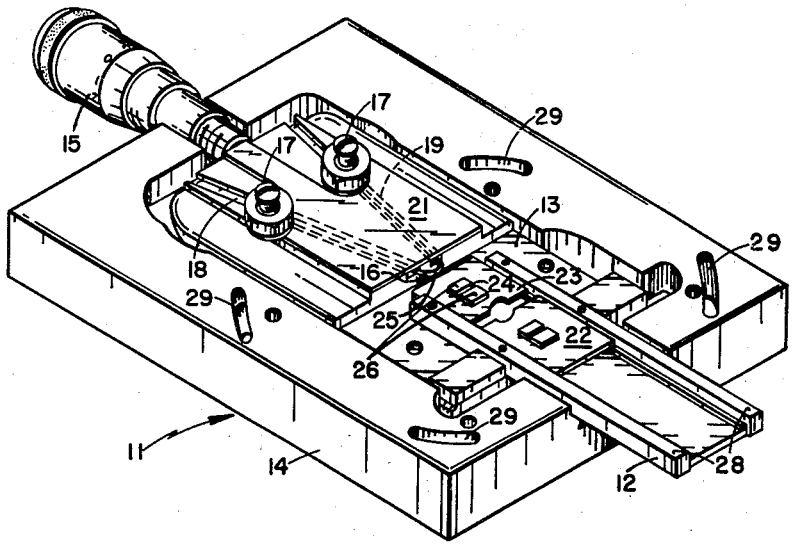
FIGURE 1 illustrates a high speed shutter constructed in accordance with the present invention.

With reference now to FIGURE 1, there is shown a shutter 11 comprising a dovetail guide 12 carried by spring loaded carriage 13 which in turn is carried by and is constrained to move laterally in a shutter body 14. Springs (not shown) may be provided to cause the dovetail guide 12 to maintain contact with spectrograph slit jaws (not shown) and to prevent backlash in the micrometer screw adjustment 15, more thoroughly described hereinafter. The shutter body has a hole in alignment with the slit to permit radiation to pass entirely through the device.

The extreme ends of a V-shaped actuator wire 16 are anchored in electrical terminals 17 attached to the carriage 13. Thus, the extreme ends of the actuator wire remote from its apex 25 are prevented from moving and are fixed with relation to guide 12. The actuator wire 16 is carried by the carriage 13 and is disposed in relatively wide slots 18 and 19 in the carriage to permit free lateral movement of the wire. A thin sheet of plastic 21 may be disposed over the wire 16 to protect it. An actuator wire formed of Nichrome 0.030 inch in diameter and 1½ inches long has been found to operate satisfactorily.

A first slide 22 is slidably disposed in the dovetail guide 12 and a second slide 23 carrying a slit 24 is also slidably disposed in the dovetail guide 12 intermediate the first slide 22 and the actuator wire 16 and in the unactuated position rests against the apex 25 of the actuator wire 16. The apex 25 may be flattened by peening it square.

The slides 22 and 23 which are coplanar with wire 16 may be formed from 0.01 inch thick plastic stock. The slit 24 in the second slide 23 may be conveniently formed by the milled edges of two pieces of 0.0015 inch brass shim stock 26 cemented over a hole 27 in the second slide 23 (see FIGURE 2). The edges of the slides engaging the guide 12 should be carefully formed to permit free movement thereof in the dovetail guide. The exposed faces of the shim stock 26 forming the slit 24 should be smooth, and the exposed faces 28 of the dovetail guide 12 finished so that when the second slide 23 is inserted into the guide, the exposed faces of the shim stock forming the slit 24 are not more than about a few ten thousandths of an inch back of the exposed faces 28 of the dovetail guide. Thus, when the shutter is assembled, the face of the second slide will not be more than about a few ten thousandths of an inch from the face of the spectrograph slit.

Figure 2:
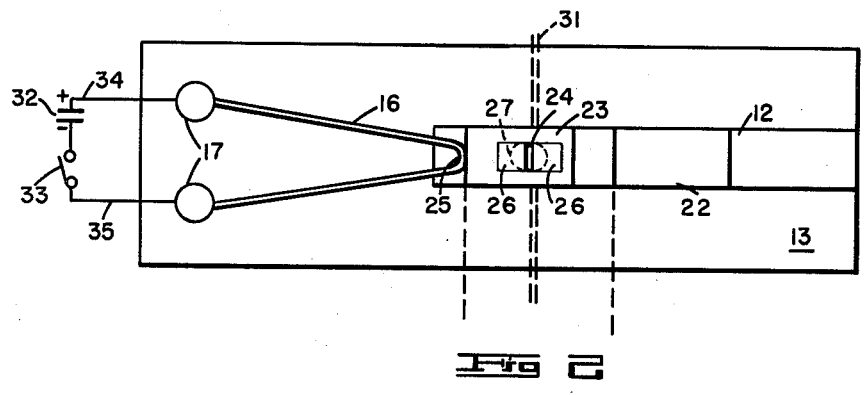
FIGURE 2 illustrates schematically the shutter of FIGURE 1 in its unactivated position.

The shutter body 14 may be fastened to the spectrograph slit holder (not shown) by inserting screws (not shown) through the openings 29 and the shutter slit 24 may be accurately aligned just behind the position of the spectrograph slit 31 (to the left thereof as shown in FIGURE 2) by the micrometer adjustment screw 15 which functions in conventional manner to move the carriage 13 to the desired position.

Figure 3:
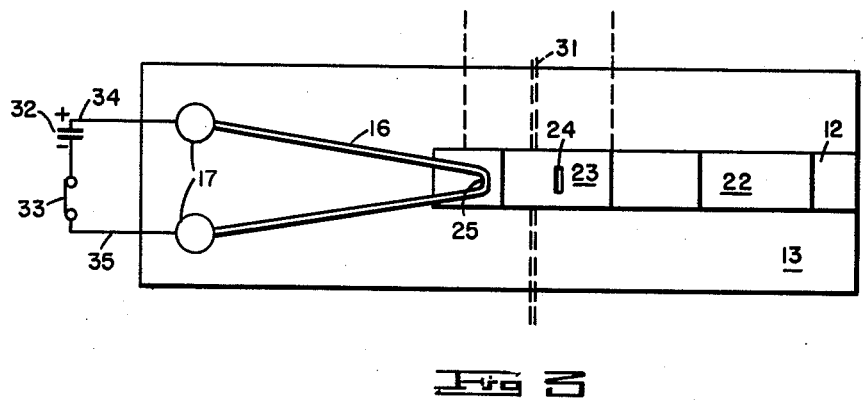
FIGURE 3 illustrates schematically the shutter of FIGURE 1 in its activated position.

With particular reference now to FIGURE 2 and FIGURE 3 which illustrate schematically the shutter and associated power supply, the shutter is activated by a capacitor 32 in series with a thyratron 33 connected across the electrical terminals 17. An 850 volt, 50 microfarad capacitor has been found satisfactory. As shown in FIGURE 2, before actuation the second slide 23 rests against the flattened apex 25 of the actuator wire 16, and the slit therein is located just to the left of the spectrograph slit position 31 thereby blocking the spectrograph slit. When an electrical triggering signal (not shown) fires the thyratron 33, the previously charged capacitor 32 discharges through thyratron 33, conductors 34 and 35, and the actuator wire 16. The actuator wire is thus heated to several hundred degrees centigrade in about 10 microseconds by the discharge current, rapidly expands a few thousandths of an inch, and imparts an impulse to the second slide 23. The impulse accelerates the second slide 23 to a maximum velocity of about 800 centimeters per second, thus causing the slit 24 in the second slide 23 to rapidly move to the right of the position of the spectrograph slit 31, as shown in FIGURE 3. Thus, a 20 micron slit on the second slide 23 will travel across a 20 micron spectrograph slit 31, closed-open-closed in 5 microseconds, giving an effective exposure time of 2.5 microseconds. In the embodiment described hereinabove there is an inherent delay of about 20±2 microseconds from the time the trigger pulse is applied to the thyratron to the time the shutter begins to open. Exposure time may be varied by varying the capacitance, the capacitor voltage, the slide slit width, or combinations of these variables. Varying the exposure by using slides with different slit widths has the advantage of keeping the exposure delay constant. This delay may be adjusted independently by positioning the slide slit at various distances behind or to the left of the spectrograph slit. The first slide 22 functions to stop the second slide 23. Prior to actuation the first slide 22 rests close to the second slide 23, as shown in FIGURE 2. Upon actuation, the speeding second slide 23 collides with the stationary first slide 22 and, as with billiard balls, momentum exchange takes place, thus stopping the second slide 23 and sending the first slide 22 to the end of the dovetail guide 12 where its energy may be dissipated by a viscous damping medium such as for example, electrical insulating tape.

Figure 4:
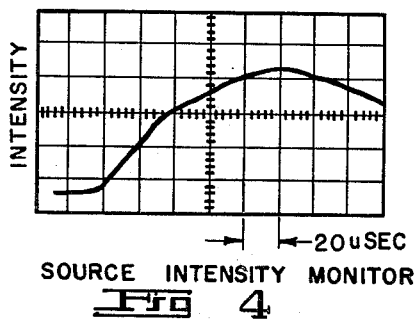
FIGURES 4 and 5 are graphic illustrations of oscillograms illustrating the performance of a shutter constructed in accordance with the present invention in making a spectrogram of the radiation from air heated to a high temperature by a reflected shock in a shock tube.
Figure 5:
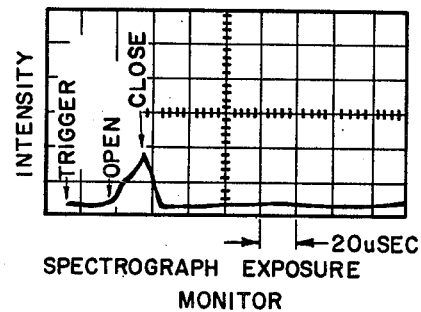

FIGURE 4 and FIGURE 5 are graphic illustrations of oscillograms illustrating the performance of the shutter in making a spectrogram of the radiation from air heated to a high temperature by a reflected shock in a shock tube. These figures show simultaneous oscillogram records of the radiation intensity when viewed directly and when viewed through the spectrograph, FIGURE 4 showing the radiation intensity when viewed directly, and FIGURE 5 showing the radiation intensity when viewed through the spectrograph. The spectrograph was sighted along the axis of the shock tube to avoid impurity radiation from the region of the shock tube wall, and FIGURE 4 and FIGURE 5 illustrate how radiation from the incident shock, and from impurities late in the shock, is avoided. The spectrograph slit was 40 microns and the shutter slit was 120 microns for this exposure. Inspection of FIGURE 5 will show that the exposure time and the delay time were each about 20 microseconds.

It will be obvious to those skilled in the art that the slides may, with only minor modifications to the device, function for example to open and/or close one or more electrical circuits. Further, inasmuch as the actuator wire vibrates by reason of its sudden expansion as a result of a large current pulse it will be appreciated that this effect may be advantageously utilized to provide an oscillator, actuator, switch, or the like in accordance with the present invention. Thus, for certain applications the guide and its associated components may be omitted.

The various features and advantages of the invention disclosed are thought to be clear from the foregoing description. Other features and advantages not specifically enumerated will undoubtedly occur to those versed in the art, as likewise will many variations and modifications of the preferred embodiment of the invention illustrated, all of which may be achieved without departing from the spirit and scope of the invention as defined by the following claims.

I claim:

1. The combination comprising: a base; a generally U-shaped wire having two ends and a bight carried by said base; means for preventing movement of the ends of said wire; a first member movably carried by said base, said first member being movable into contact and out of contact with the bight of said wire; and means for passing electric current through said wire to effect rapid heating thereof sufficient to cause sudden expansion of said wire and application thereby of an impulse to said first member.

2. The combination comprising: a base; a generally U-shaped wire having two ends and a bight carried by said base; means for preventing movement of the ends of said wire; a first member movably carried by said base and coplanar with said wire, said first member being freely movable into substantially tangential contact and out of contact with the bight of said wire; and means for passing a pulse of electric current through said wire, said pulse of current having a magnitude and time rise sufficient to heat said wire to several hundred degrees centigrade in about ten microseconds and application thereby of an impulse to said first member.

3. A shutter comprising: a base having an open ended guide at one end and a first opening therethrough; a generally U-shaped wire having two ends and an apex carried by the other end of said base; means for attaching the ends of said wire to said base, the apex of said wire being adjacent the open end of said guide; a slide movably disposed in said guide and movable into contact with the apex of said wire, said slide having a second opening in alignment with said first opening at a predetermined position of said slide; and means for effecting rapid heating of said wire sufficient to cause sudden expansion of said wire and application thereby of an impulse to said slide.

4. A shutter comprising: a base having an open ended guide at one end and a first opening therethrough; a generally U-shaped wire having two ends and an apex carried by the other end of said base; means for attaching the ends of said wire to said base, the apex of said wire being adjacent the open end of said guide; a slide movably disposed in said guide and movable into substantially tangential contact with the apex of said wire, said slide being substantially coplanar with said wire and having a second opening in alignment with said first opening at a predetermined position of said slide; and means for effecting rapid heating of said wire sufficient to cause sudden expansion of said wire and application thereby of an impulse to said slide.

5. A shutter comprising: a base having an open ended guide at one end and a first opening therethrough; a generally U-shaped wire having two ends and an apex carried by the other end of said base; first means for attaching the ends of said wire to said base, the apex of said wire being adjacent the open end of said guide; a slide movably disposed in said guide and movable into substantially tangential contact with the apex of said wire, said slide being substantially coplanar with said wire and having a second opening in alignment with said first opening at a predetermined position of said slide; and second means for passing electrical current through said wire to effect rapid heating thereof sufficient to cause sudden expansion of said wire and application thereby of an impulse to said slide.

6. The combination as defined in claim 5 wherein said second means includes a source of current and means to suddenly connect said source of current across the ends of said wire.

7. The combination as defined in claim 5 wherein said wire has a high electrical resistance.

8. A high speed shutter comprising: a shutter body; a carriage having a middle portion and two end portions laterally movable in the shutter body; an open ended guide carried by said carriage and extending from about the middle portion to one end portion of said carriage, said guide, carriage and shutter body each having an opening aligned one with another; a V-shaped high resistance wire having two legs and a flattened apex carried by the other end portion of said carriage, said flattened apex being located at least adjacent the open end of said guide and substantially perpendicular to the longitudinal axis of said guide; means for preventing movement of the extreme ends of the legs of said wire remote from the apex thereof; means for passing electrical current through said wire to heat said wire to several hundred degrees centigrade in about five to fifteen microseconds; a slide slidably carried by said guide, said slide being substantially coplanar with said wire and movable into and out of contact with the apex of said wire, said slide having an opening in alignment with the opening in said guide at a predetermined position of said slide; and means for laterally varying the position of said carriage in said shutter body.

References Cited in the file of this patent

UNITED STATES PATENTS

| | | |
|---|---|---|
| 1,237,239 | Bunnell | Aug. 14, 1917 |
| 2,124,473 | Ross | July 19, 1938 |
| 2,324,076 | Goldberg | July 13, 1943 |